United States Patent [19]

Yen

[11] Patent Number: 5,126,509
[45] Date of Patent: Jun. 30, 1992

[54] STRUCTURE OF BASEBOARD ASSEMBLY AND QUICK JOINT TYPE RECEPTACLE

[76] Inventor: Tai C. Yen, No. 370, Chung Hua Road, Sec. 2., Taipei, Taiwan

[21] Appl. No.: 486,653

[22] Filed: Mar. 1, 1990

[51] Int. Cl.$^5$ .............................................. E04B 5/48
[52] U.S. Cl. .................................. 174/48; 174/99 R; 174/52.1; 52/221
[58] Field of Search ............... 174/48, 99 R, 50, 52.1, 174/65 R; 52/220, 221

[56] References Cited

U.S. PATENT DOCUMENTS

| | | | |
|---|---|---|---|
| 2,306,353 | 12/1942 | Cole et al. ........................ | 174/99 X |
| 2,900,814 | 8/1959 | Carson ............................. | 174/48 X |
| 4,156,795 | 5/1979 | Lacan .............................. | 174/48 X |
| 4,534,147 | 8/1985 | Cristell ............................ | 52/220 X |
| 4,593,505 | 6/1986 | Russell ............................ | 52/221 |
| 4,596,098 | 6/1986 | Finkbeiner et al. .............. | 52/220 |
| 4,631,881 | 12/1986 | Charman ......................... | 52/220 |
| 4,656,798 | 4/1987 | Hazen .............................. | 174/48 X |
| 4,707,563 | 11/1987 | Conrad et al. ................... | 174/50 |
| 4,713,918 | 12/1987 | Cioffi .............................. | 52/221 |
| 5,062,246 | 11/1991 | Sykes .............................. | 52/221 X |

FOREIGN PATENT DOCUMENTS

| | | | |
|---|---|---|---|
| 1539464 | 10/1979 | Fed. Rep. of Germany ........ | 174/50 |
| 2565431 | 12/1985 | France ............................. | 174/48 |
| 7249 | of 1904 | United Kingdom ............... | 174/99 |

Primary Examiner—David A. Scherbel
Assistant Examiner—Lan Mai
Attorney, Agent, or Firm—Lowe, Price, LeBlanc & Becker

[57] ABSTRACT

A baseboard assembly for indoor wiring and for the mounting of quick joint type receptacles, which includes a top cover board releasably retained with a front face board to define therein several stories of conduits for the arrangement therein of power cords, telephone cables, antenna conductors and other conductive wires. The top cover board and the front face board are respectively divided into a plurality of independent partitions having each a releasable strip corresponding to the conduits therein, such that either releasable strip can be removed for the mounting therein of a quick joint type receptacle.

7 Claims, 7 Drawing Sheets

STRUCTURE OF BASEBOARD ASSEMBLY AND QUICK JOINT TYPE RECEPTACLE

BACKGROUND OF THE INVENTION

The present invention is to provide a baseboard assembly which includes therein a plurality of stories of conduits for house wiring and to which a variety of quick joint type receptacles can be releasably fastened for conductive connection.

In construction industry, conduits are generally embedded beneath each floor during the construction of a building, so that interior wiring operation can be made conveniently. According to the conventional method in house wiring operation, receptacles are mounted on fixed locations in a house. Due to the limitation of fixed receptacles, extension lines shall be used for the connection of electrical home appliances, office machines, machine tools, . . . etc., when they are placed at locations far from the receptacles. Further, for the installation of TV antenna and telephone apparatus, the arrangement of wiring is rather inconvenient and may unfavorably affect the beauty of indoor decoration. The present invention gives a total solution to the said problem by means of utilizing the space of regular baseboard of a building.

SUMMARY OF THE INVENTION

One object of the present invention is to provide a baseboard assembly which defines therein several channels for wiring and comprises a plurality of releasable face panels for the mounting of a variety of quick joint type receptacles at locations according to requirement.

Another object of the present invention is to provide quick joint type receptacles for quick conductive connection, which have each a plurality of protruding contact plates respectively spaced away from and not in alignment with one another of which each contact plate comprises a V-shaped notch forming a sharp edge for cutting the insulator of a conductor cable or the like and defining therein a circular hole for receiving the inner conductor of such a conductor cable for quick conductive connection.

The advantages of the present invention are outline hereinafter.

1. Interior power cable, control line, TV antenna conductor, telephone cable and other wiring can be conveniently received in respective conduits inside a baseboard assembly to keep a house clean and beauty;

2. Power source receptacles can be flexibly mounted on any preferred locations;

3. The present invention is practical for use on any building either under-construction or well constructed;

4. Single-phase double-line and single-phase tri-line receptacles are available for AC110/220V for wide application;

5. No embedded conduit for wiring is required during the construction of a building, and strong wall board structure can be secured; and 6. Change, expansion or maintenance of house wiring becomes easy.

BRIEF DESCRIPTION OF THE DRAWINGS

FIG. 3-1 are schematic drawings illustrating two different types of contact plates according to the present invention, which are respectively inserted through a wall;

DESCRIPTION OF DESIGNATED NUMERALS:

(1) . . . Baseboard assembly
(11) . . . Conduit
(12) . . . Face panel
(121) . . . Releasable strip
(122) . . . Groove
(13) . . . Top cover board
(131) . . . Releasable strip
(132) . . . Tongue
(2) . . . Receptacle
(21) . . . Insulator
(22) . . . Contact plate
(23) . . . V-shaped notch
(24) . . . Circular hole
(25) . . . Spring leaf
(26) . . . Retainer portion
(27) . . . Plug hole
(41) . . . Insulator
(42) . . . Copper wires
(5) . . . TV antenna receptacle
(51) . . . Terminal
(52) . . . Contact plate
(53) . . . Body
(54) . . . Projection
(55) . . . Push plate
(56) . . . Recessed portion
(521) . . . V-shaped notch
(522) . . . Circular hole
(551) . . . V-shaped notch
(6) . . . Telephone cable receptacle
(61) . . . Push plate
(62) . . . Framed structure
(63) . . . Contact plate
(64) . . . Tapered projection
(65) . . . Tapered groove
(66) . . . Circular groove
(67) . . . V-shaped notch
(7) . . . Antenna conductor
(71) (72) . . . Negative and positive cords
(8) . . . Telephone cable
(9) . . . Double-end contact plate
(91) . . . V-shaped notch
(92) . . . Circular hole
(A) . . . Electric power receptacle channel
(B) . . . Power source control channel
(C) . . . Low voltage DC channel
(D) . . . video signal interference protective reservation channel
(E) . . . Video signal specific channel (F) . . . Telephone and telecommunication specific channel (G) . . . Vermin-proof reservation channel

DETAILED DESCRIPTION OF THE PREFERRED EMBODIMENTS

Figure 2:
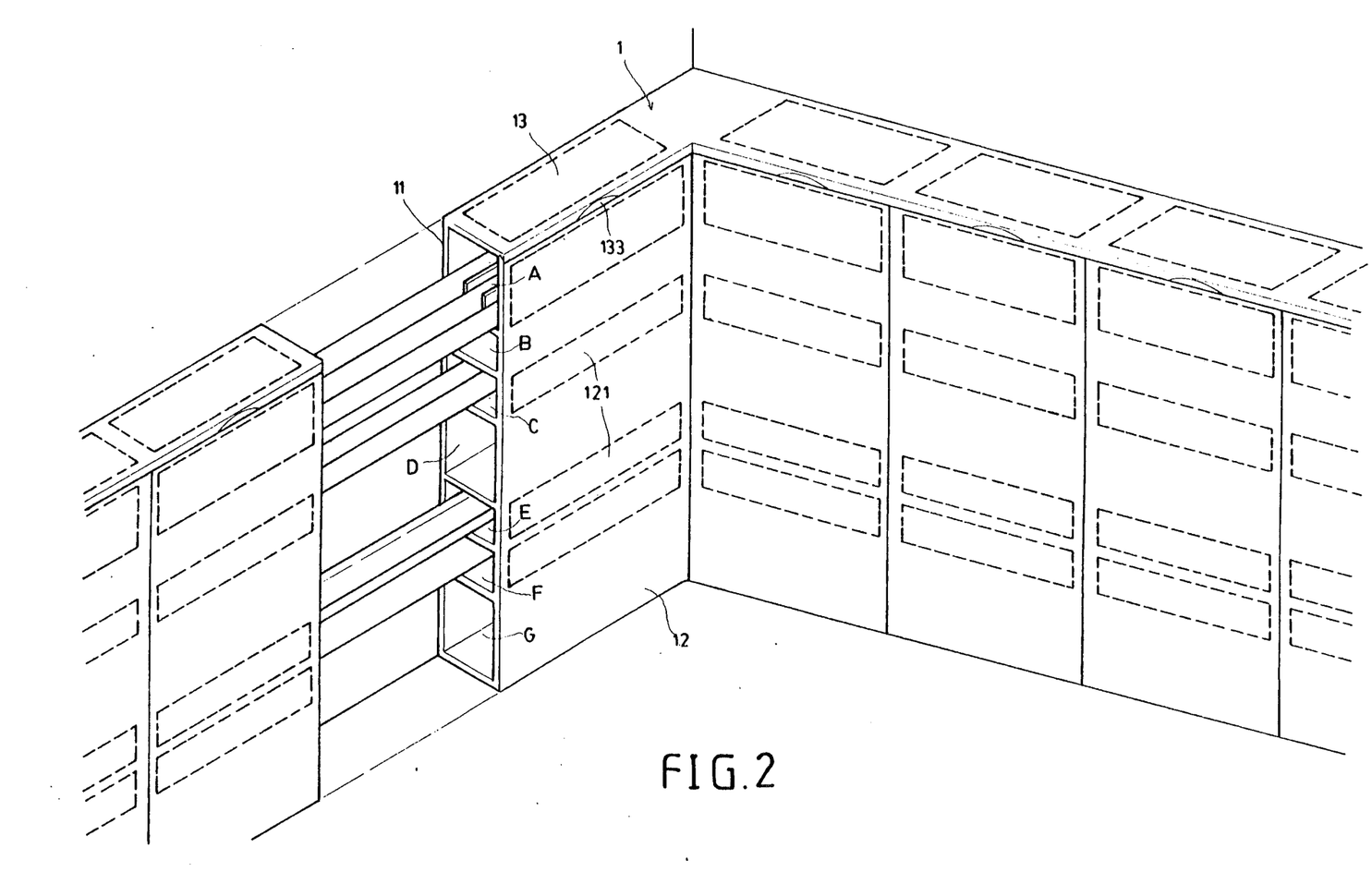
FIG. 2 is a schematic drawing illustrating a structure of baseboard assembly according to the present invention.
Figures 3, 3A:
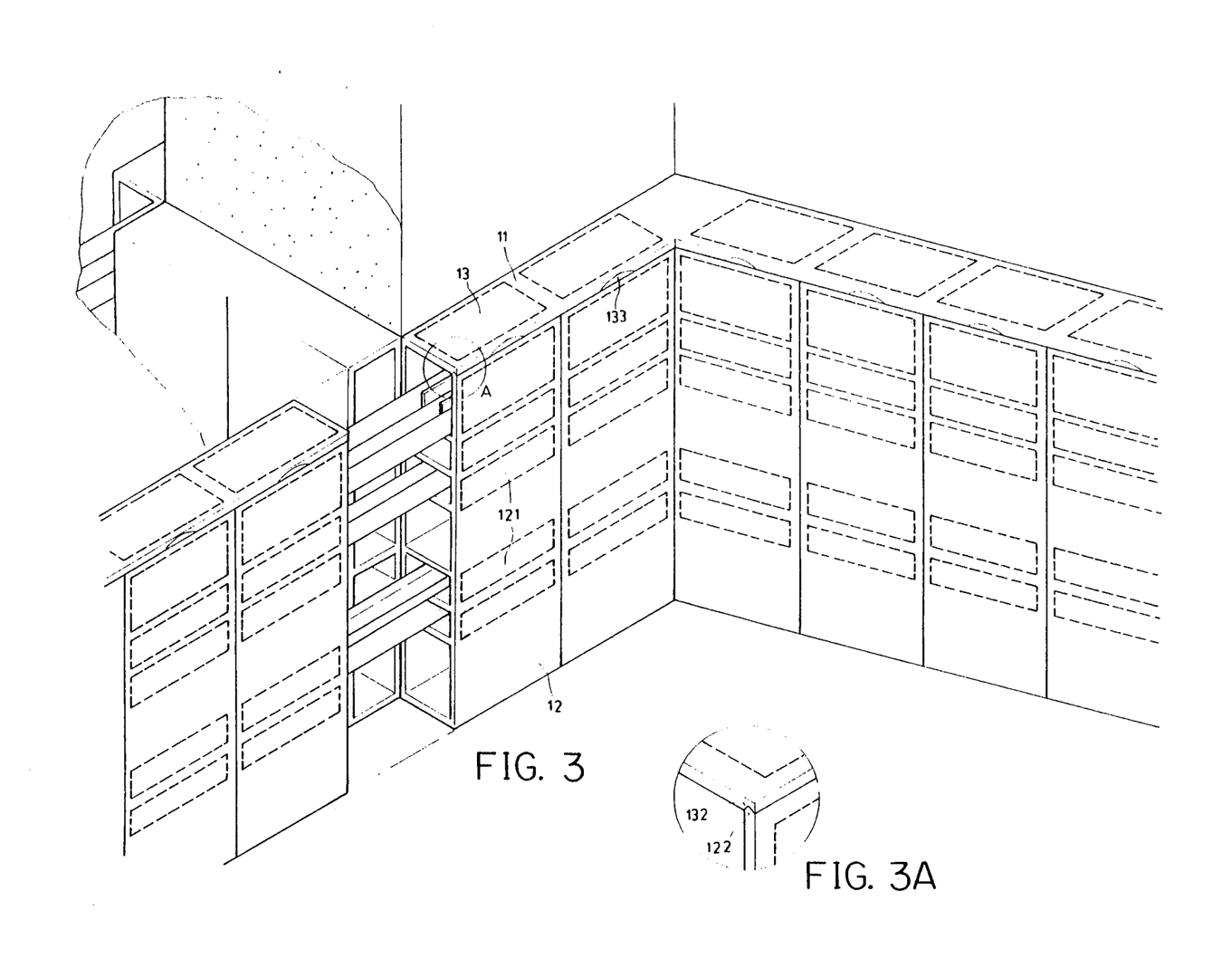

Referring to FIG. 2, a baseboard assembly (1) in accordance with the present invention comprises therein several stories of conduits (11) which are divided into, from the top to the bottom in proper order, an electrical power receptacle channel (A), a power source control channel (B), a low voltage DC channel (C), a video signal interference protective reservation channel (D), a Video signal specific channel (E), a telephone and telecommunication specific channel (F) and a vermin-proof reservation channel (G). The size of each channel is sufficient for receiving electric wire, conductor cable and electrical receptacle. The front face of the baseboard assembly (1) is divided into a plurality of face panels (12) respectively connected together to form a face board. The face panels (12) of the baseboard assembly (1) comprise each a plurality of releasable strips (121) corresponding to the conduits (11) therein such that any of the strips (121) can be conveniently removed from the baseboard assembly (1) for the mounting therein of a quick joint type receptacle. The top cover board (13) of the baseboard assembly (1) also comprises a plurality of releasable strips (131) spaced from one another at equal interval, so that quick joint type receptacle can be mounted therein as desired. The releasable strips (121) (131) are designed in size respectively corresponding to the quick joint type receptacles (2) that are used. (The structure of the quick joint type receptacle (2) will be described further).

The top cover board (11) and the face panels (12) are retained together by means of tongue (132) and grooves (122). A blind hole (133) each is made between the top cover board (11) and each face panel (12) such that the top cover board (11) can be conveniently lifted to release the face panels (12) from its constraint and allow the face panels (12) to open for the installation of wiring in its inner conduits (11) or for maintenance.

Figure 1:
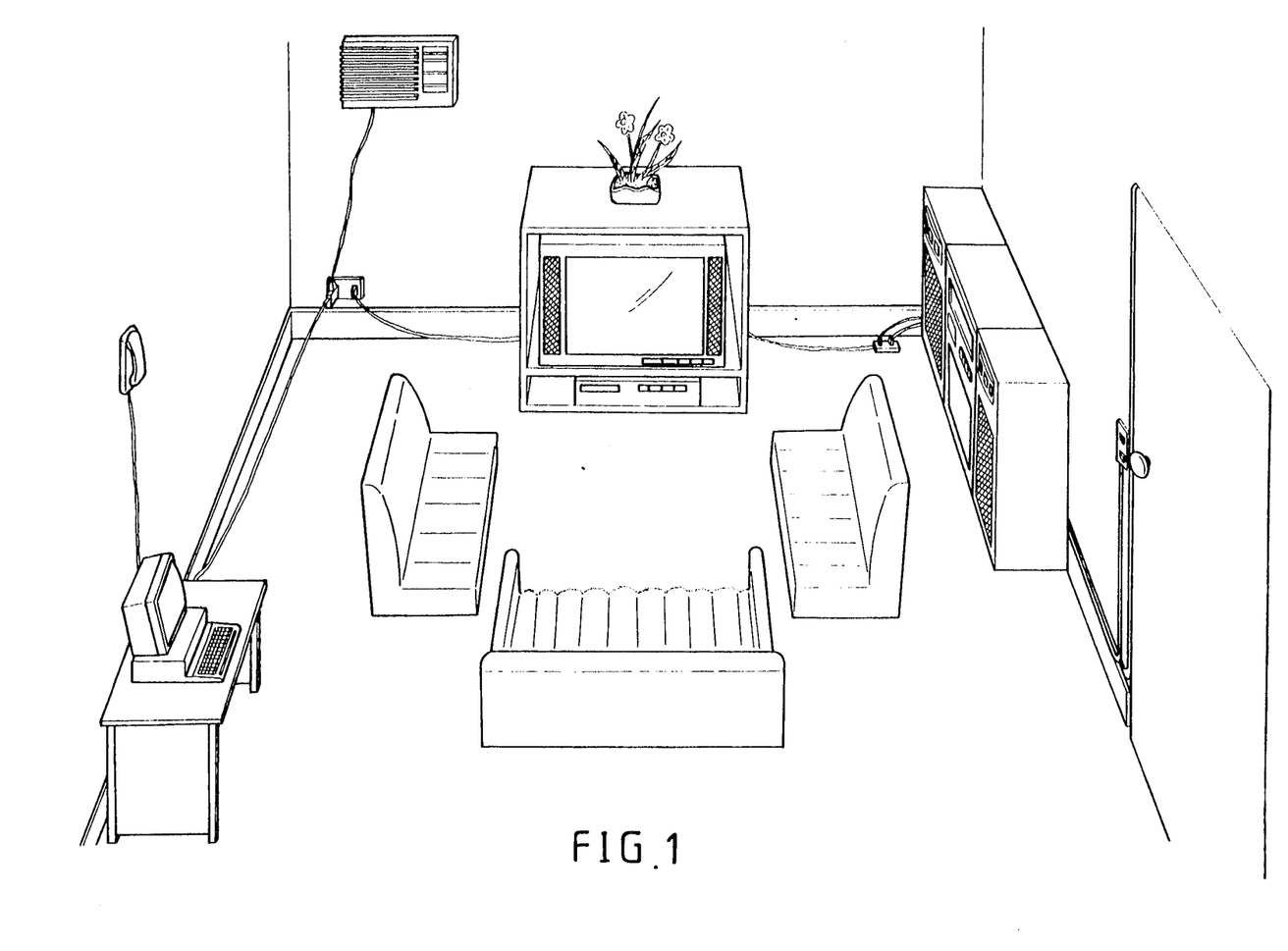
FIG. 1 is a schematic drawing illustrating the arrangement of regular baseboard and receptacles in a house.
Figures 1A, 3:
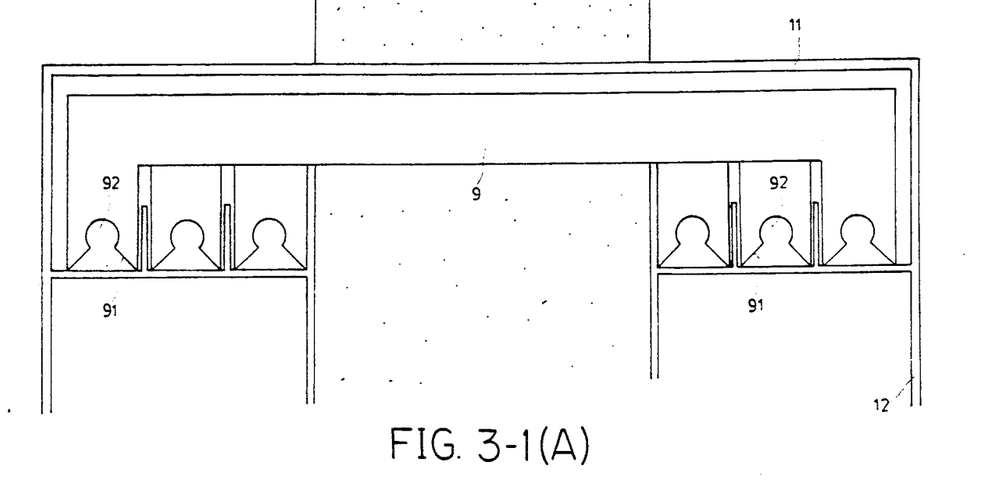
FIG. 3 illustrates an alternate form of baseboard assembly according to the present invention.
Figures 1B, 3:
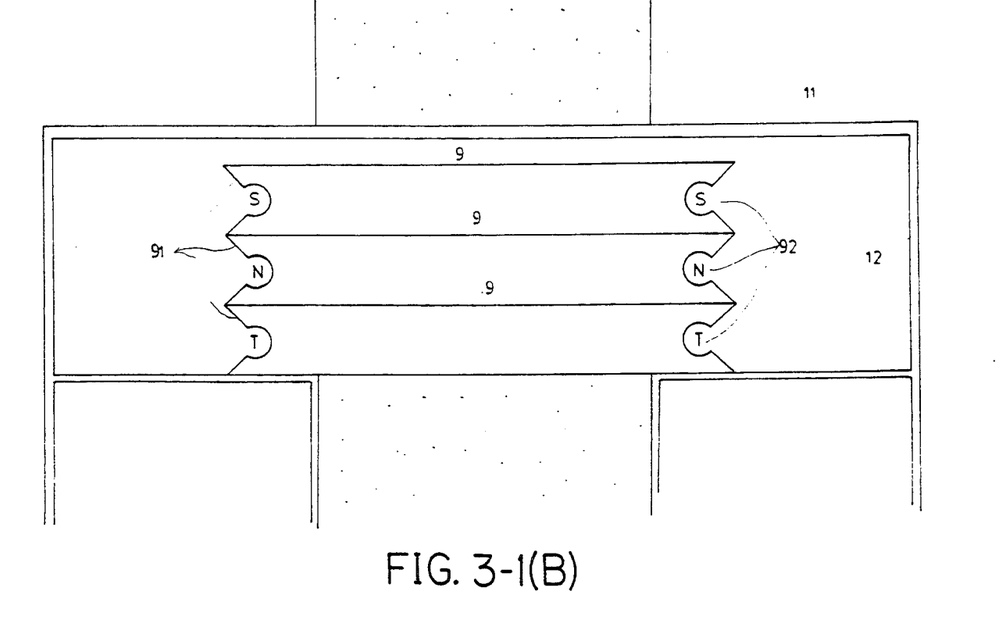

According to the foregoing statement, electrical wires and conductor cables can be arranged through the baseboard assembly (1) of the present invention around every corner inside a house and, receptacles can be installed at desired locations. FIG. 3 illustrates a construction of a baseboard assembly according to the present invention. As illustrated, a baseboard assembly (1) is made on a wall during its construction. Double-end contact plates (9) (the structure of which will be described further) may be set inside a wall for quick electrical connection from one side of a wall to the opposite side of such a wall.

Figures 4A, 4B, 4C:
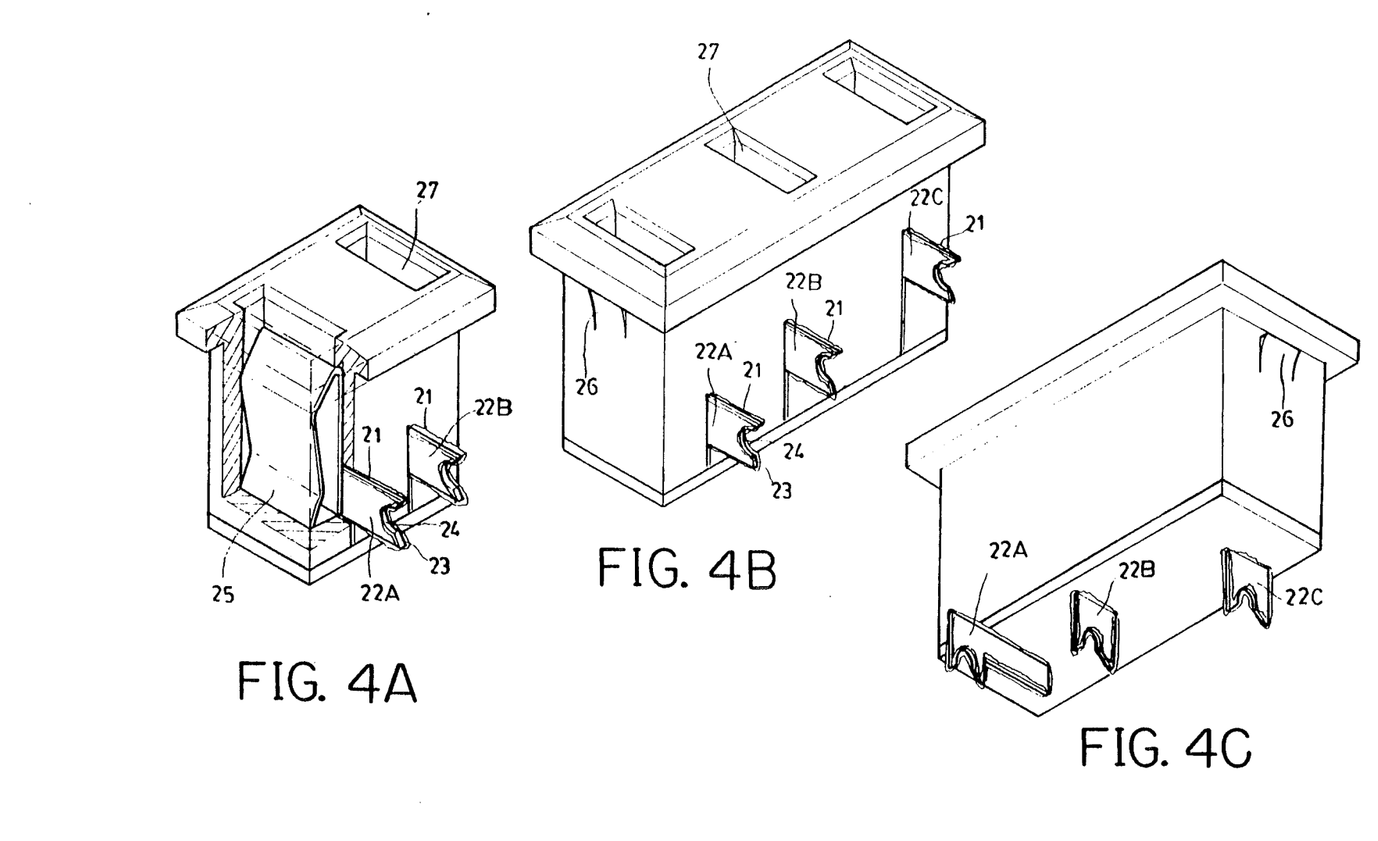
FIG. 4 illustrates various types of quick joint type receptacles according to the present invention.
Figure 5:
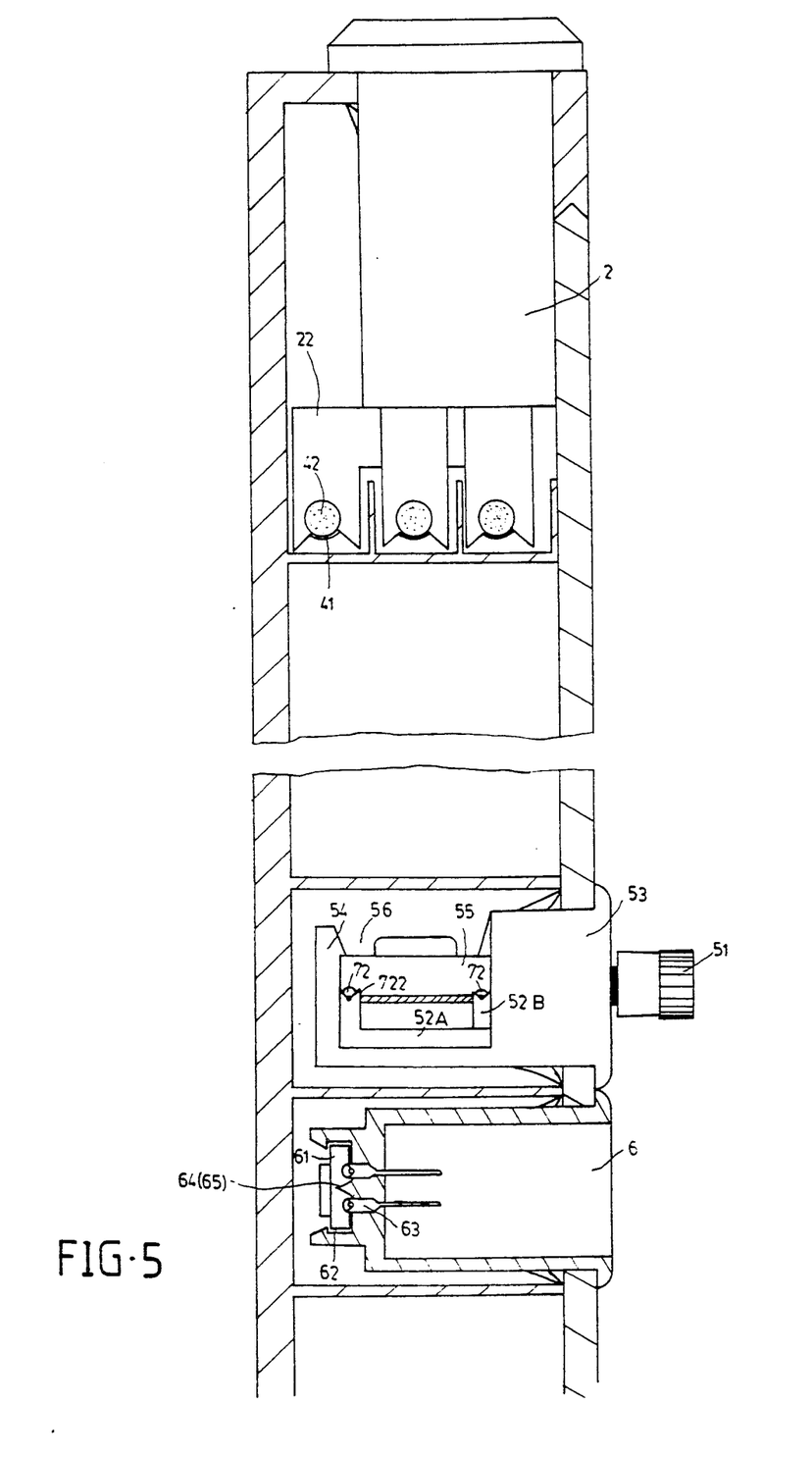
FIG. 5 is a schematic sectional view, illustrating the operation of a quick joint type TV antenna receptacle and a quick joint type telephone cable receptacle in accordance with the present invention.

Referring to FIGS. 4 and 5, there are illustrated various embodiments of quick joint type receptacle according to the present invention, in which drawing (A) indicates a single-phase double-line receptacle (2A) which includes two plug holes (27) having two contact plates (22A, 22B) extending outward from the spring leaves (25) therein, which two contact plates (22A, 22B) are spaced from each other at different altitude but not in alignment with each other. The two contact plates (22A, 22B) comprise each a V-shaped notch (23) having a sharp edge and defining therein a circular hole (24). The two contact plates (22A, 22B) of the receptacle (2A) are made of copper material and respectively covered with a plastic insulator (21) permitting the V-shaped notches (23) thereof to be exposed outside for quick connection. During the installation of the receptacle (2A), the V-shaped notches (23) of the two contact plates (22A, 22B) are used to cut in two conductor cables respectively, permitting the two conductor cables to be firmly retained in the circular holes (24) of the two contact plates (22A, 22B). The foregoing double-end contact plates (9) have a similar structure as the contact plates of the present embodiment of receptacle (2A). In FIG. 3-1, drawing (A) illustrates a vertically plug-in type of double-end contact plate, and drawing (B) illustrates a side-push type of double-end contact plate.

In FIG. 4, the drawings (B) and (C) illustrate single-phase tri-line receptacles for 220 V, in which each receptacle (2) comprises three contact plates (22A, B, C) which are not aligned together and respectively spaced from one another at different altitude. A vertical plug-in type of receptacle (in drawing C) is suitable for mounting through the top cover board (11), while the side-push type of receptacle (in drawing B) is suitable for mounting through the face panels (12). Each receptacle (2) comprises two resilient retainer portions (26) on its both sides so that it can be firmly set in the top cover board (11) or each of the face panels (12) to replace a releasable strip (121) or (131) with its two resilient retainer portions (26) respectively stopped against the strip frame of such a releasable strip (121) or (131).

Figure 6A:
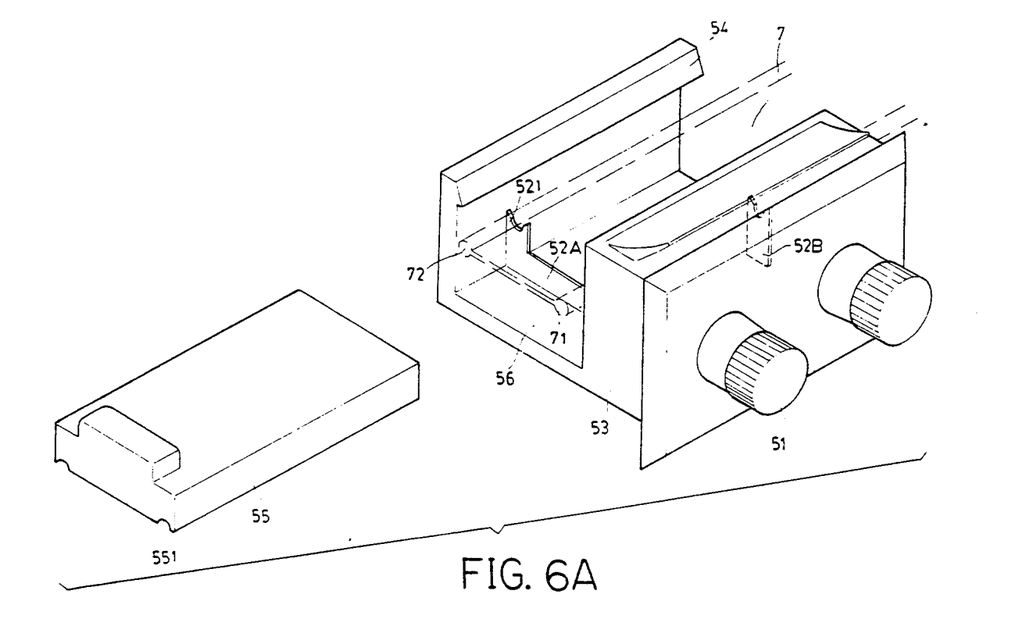
FIG. 6 is a fragmentary perspective view of the quick joint type TV antenna receptacle and the quick joint type telephone cable receptacle of FIG. 5.
Figure 6B:
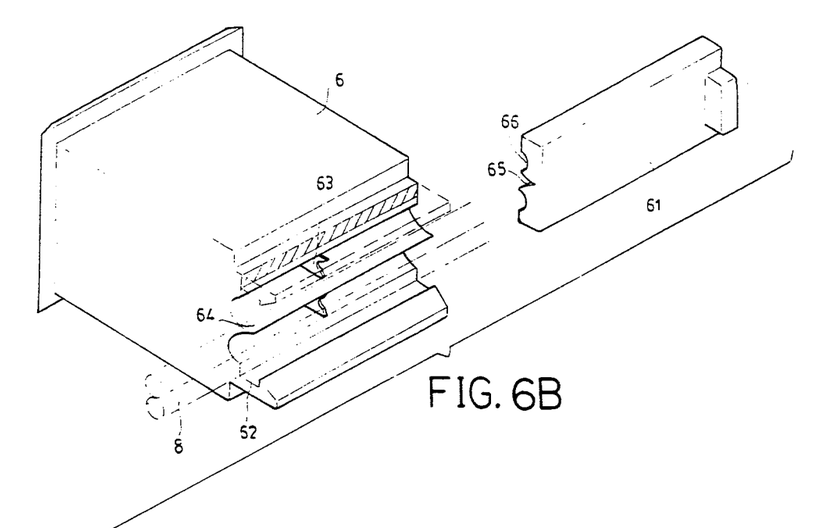

Referring to FIGS. 5 and 6, therein illustrates are an embodiment of quick joint type TV antenna receptacle (5) and an embodiment of quick joint type telephone cable receptacle (6) in accordance with the present invention. As illustrated a TV antenna receptacle according to the present invention includes therein two contact plates (52A, 52B) respectively connected to the positive and negative terminals (51) thereof and arranged at different length. Same as the foregoing embodiments of contact plate, the two contact plates (52A, 52B) comprises each a V-shaped notch (521) and a circular hole (522) on its rear end for quick connection. The body (53) of the receptacle (5) has a recessed portion (56) transversely penetrating therethrough to define therewith a projection each (54) bilaterally at an upper position so that a push plate (55) is allowed to insert therein. The push plate (55) comprises two elongated, circular grooves (551) longitudinally bilaterally through its bottom surface corresponding to the V-shaped notches (521) of the two contact plates 52A, 52B) of the television antenna receptacle (5). When the positive and negative cords (71, 72) of the antenna conductor (7) are respectively set in the V-shaped notches (521), the push plate (55) are inserted in the recessed portion (56) of the receptacle (5) with its circular grooves (551) respectively pressing on the antenna conductor (7) so that the sharp edges of the V-shaped notches (521) can cut in the insulators of the positive and negative cords (71, 72) of the antenna conductor (7) permitting the circular holes (522) of the two contact plates (52A, 52B) to contact the positive and negative cords (71, 72) of the antenna conductor (7) to form a closed circuit. The circular holes (522) of the two contact plates (52A, 52B) must be properly made in size to fit in with the diameter of copper wires of the positive and negative cords (71, 72) so that conductive contact can be ensured. A quick joint type telephone cable receptacle (6) in accordance with the present invention includes a framed structure (62) on its bottom for the setting therein of a push plate (61), two contact plates (63) extending downward through its bottom surface, and an elongated, bilaterally tapered projection (64) on its bottom to protect its two contact plates (63) from contact. The push plate (61) of the telephone cable receptacle (6) includes a longitudinally tapered groove (65) in the middle and two circular grooves (66) at both sides. As soon as a telephone cable (8) is mounted on the V-shaped notches (67) of the two contact plates (63) and the push plate (61) is set in the framed structure (62) of the receptacle (6), the longitudinally tapered groove (65) is forced to separate the positive and negative cords of the telephone cable (8) so that it can be firmly engaged with the elongated, bilaterally tapered projection (64), and the positive and negative cords of the telephone cable (8) can be respectively in contact with the two contact plates (63) for line connection.

According to the present invention, the circular grooves (551) or (66) of the push plates (55) or (61) are gradually reducing from the from to the rear end so that the push plate (55) or (61) can smoothly squeeze the antenna conductor (7) or the telephone cable (8) to the contact plates (52A, 52B) or (63) for conductive connection.

I claim:

1. A baseboard assembly comprising a top cover board releasably retained with a front face board to define therein several stories of conduits for the arrangement therein of power cords, telephone cables, antenna conductors and other conductive wires, said top cover board and front face board being respectively divided into a plurality of independent partitions having each a releasable strip corresponding to said conduits,
   wherein the releasable strips on the independent partitions of said top cover board and front face board can be selectively removed from the baseboard assembly for the mounting therein of a quick joint type receptacle, said quick joint type receptacle having a metal contact plate extending outward from each of the spring leaves therein, said contact plate comprising a V-shaped notch having a sharp edge and defining therein a circular hole,
   characterized in that the sharp edge of said V-shaped notch of said contact plate is used to cut in the insulator of a connected conductor cable permitting the copper wires of such a conductor cable to set in the circular hole of said V-shaped notch for conductive connection.

2. A baseboard assembly according to claim 1, wherein each metal contact plate of said quick joint type receptacle is covered with a plastic insulator with its circular hole and the sharp edge of its V-shaped notch exposed outside for quick connection.

3. A baseboard assembly according to claim 1, wherein said quick joint type receptacle is used for connecting TV antenna conductor and includes a recessed portion transversely penetrating therethrough for the setting therein of two metal contact plates which are respectively connected to the positive and negative terminals thereof, said metal contact plate comprising each a V-shaped notch and a circular hole on its rear end and disposed upward for quick connection, and a push plate set to cover on said recessed portion, said push plate comprising two elongated, circular grooves longitudinally bilaterally penetrating through its bottom surface and corresponding to the V-shaped notches of said two metal contact plates such that the positive and negative cords of a TV antenna conductor can be squeezed in between said V-shaped notches and said circular grooves permitting the copper wires of the positive and negative cords of said TV antenna conductor to be set in the circular holes of said two metal contact plates for quick conductive connection.

4. A baseboard assembly according to claim 3 wherein said quick joint type receptacle includes two inward projections bilaterally on the top of the opening of said recessed portion to retain said push plate when said push plate is inserted therein.

5. A baseboard assembly according to claim 1 wherein said quick joint type receptacle is used for connecting telephone cable and comprises a recessed portion for the connection thereto of a plush plate and having an elongated, bilaterally tapered projection to protect its two contact plates from contact with each other, said push plate comprising a longitudinally tapered groove in the middle and two circular grooves at both sides respectively corresponding to said elongated, bilaterally tapered projection and the V-shaped notches of said two metal contact plates.

6. A baseboard assembly according to claim 1, wherein said quick joint type receptacle can be a single-phase double-line or single-phase tri-line type for AC100/220V.

7. A baseboard assembly comprising a top cover board releasably retained with a front face board to define therein several stories of conduits for the arrangement therein of power cords, telephone cables, antenna conductors and other conductive wires, said top cover board and front face board being respectively divided into a plurality of independent partitions having each a releasable strip corresponding to said conduits,
   wherein the releasable strips on the independent partitions of said top cover board and front face board can be selectively removed from the baseboard assembly for the mounting therein of a quick joint type receptacle, said quick joint type receptacle having a metal contact plate extending outward from each of the spring leaves therein, said contact plate comprising a V-shaped notch having a sharp edge and defining therein a circular hole.

* * * * *